(12) United States Patent
Shen et al.

(10) Patent No.: US 10,804,713 B2
(45) Date of Patent: Oct. 13, 2020

(54) CHARGE-DISCHARGE DEVICE AND CONTROL METHOD OF THE SAME

(71) Applicant: ASUSTeK COMPUTER INC., Taipei (TW)

(72) Inventors: Feng-Chi Shen, Taipei (TW); Tsung-Han Wu, Taipei (TW); Chien-Chung Lo, Taipei (TW); Yii-Lin Wu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 388 days.

(21) Appl. No.: 15/838,680

(22) Filed: Dec. 12, 2017

(65) Prior Publication Data

US 2018/0183248 A1    Jun. 28, 2018

(30) Foreign Application Priority Data

Dec. 22, 2016   (TW) .............. 105142832 A

(51) Int. Cl.
*H02J 7/00* (2006.01)
*H02J 7/34* (2006.01)

(52) U.S. Cl.
CPC .............. *H02J 7/0029* (2013.01); *H02J 7/00* (2013.01); *H02J 7/342* (2020.01); *H02J 7/00306* (2020.01)

(58) Field of Classification Search
USPC ....................................... 320/106
See application file for complete search history.

(56) References Cited

U.S. PATENT DOCUMENTS

| 8,242,742 B2 | 8/2012 | Kao et al. | |
| 2014/0354050 A1* | 12/2014 | Kung | H02J 7/0068 307/24 |
| 2016/0342492 A1* | 11/2016 | Chen | G06F 13/385 |

FOREIGN PATENT DOCUMENTS

| CN | 101320080 A | 12/2008 |
| CN | 203690903 U | 7/2014 |
| CN | 205050134 U | 2/2016 |
| CN | 205304290 U | 6/2016 |

* cited by examiner

*Primary Examiner* — Samuel Berhanu
(74) *Attorney, Agent, or Firm* — McClure, Qualey & Rodack, LLP

(57) ABSTRACT

A charge-discharge device and a control method of the charge-discharge device are provided. The control method of the charge-discharge device comprising: receiving an input voltage signal via a configuration channel of a USB port; sampling the input voltage signal in a predetermined period to generate a plurality of sampling values; selectively connecting the configuration channel to a pull-down circuit or a pull-up circuit according to the sampling values, receiving a first charging voltage via a power channel of the USB port when the configuration channel is connected to the pull-down circuit, and outputting a second charging voltage via the power channel when the configuration channel is connected to the pull-up circuit.

13 Claims, 10 Drawing Sheets

CHARGE-DISCHARGE DEVICE AND CONTROL METHOD OF THE SAME

CROSS-REFERENCE TO RELATED APPLICATION

This application claims the priority benefit of TW application serial No. 105142832, filed on Dec. 22, 2016. The entirety of the above-mentioned patent application is hereby incorporated by references herein and made a part of specification.

BACKGROUND OF THE INVENTION

Field of the Invention

The disclosure relates to a charge-discharge device and a control method of the same.

Description of the Related Art

A general mobile power bank includes two universal serial bus (USB) ports. One port is configured to be connected to a power supply device which is used to transmit power to the mobile power bank. The other port is configured to be connected to a power receiving device. The power receiving device receives the power stored in the mobile power bank when the power receiving device is connected to the mobile power bank. However, the size and the cost of the mobile power bank are increased with the configuration of two USB ports. Further, it's not easy to identify whether the two ports corresponding to the power input function or the power output function without markers near the USB port. If the two ports are not identified correctly, the mobile power bank would not be operated normally.

BRIEF SUMMARY OF THE INVENTION

According to a first aspect, a control method of a charge-discharge device is provided. The control method of a charge-discharge device comprising: receiving an input voltage signal via a configuration channel of a USB port; sampling the input voltage signal in a predetermined period to generate a plurality of sampling values; selectively connecting the configuration channel to a pull-down circuit or a pull-up circuit according to the sampling values, receiving a first charging voltage via a power channel of the USB port when the configuration channel is connected to the pull-down circuit, and outputting a second charging voltage via the power channel when the configuration channel is connected to the pull-up circuit.

According to a second aspect, a charge-discharge device is provided. The charge-discharge device comprising: a USB port, including a configuration channel and a power channel, the configuration channel is configured to receive an input voltage signal; a sampling circuit connected to the configuration channel, the sampling circuit is configured to sample the input voltage signal in a predetermined period to generate a plurality of sampling values; a pull-up circuit connected to a power source; a pull-down circuit connected to an ground terminal; a control circuit configured to generate a control signal according to the sampling values; a switching circuit connected to the control circuit, the configuration channel, the pull-down circuit and the pull-up circuit, the switching circuit is configured to be selectively operated in a first mode or in a second mode according to the control signal, in the first mode, the configuration channel is connected to the pull-down circuit via the switching circuit to make the power channel receive a first charging voltage, in the second mode, the configuration channel is connected to the pull-up circuit via the switching circuit to output a second charging voltage from the power channel.

In conclusion, the charge-discharge device and the control method of the same are provided. The charge-discharge device includes a USB port. Regardless of any one of the two ends of the USB transmission line is inserted into the USB port, the charge-discharge device is operated normally. Furthermore, the electric power is received from the power supply device or the electric power for the power receiving device is outputted via a same power channel. As a result, the production cost is saved, and the usage is more convenient.

BRIEF DESCRIPTION OF THE DRAWINGS

These and other features, aspects and advantages of the invention will become better understood with regard to the following embodiments and accompanying drawings.

DETAILED DESCRIPTION OF THE EMBODIMENTS

Figure 1A:
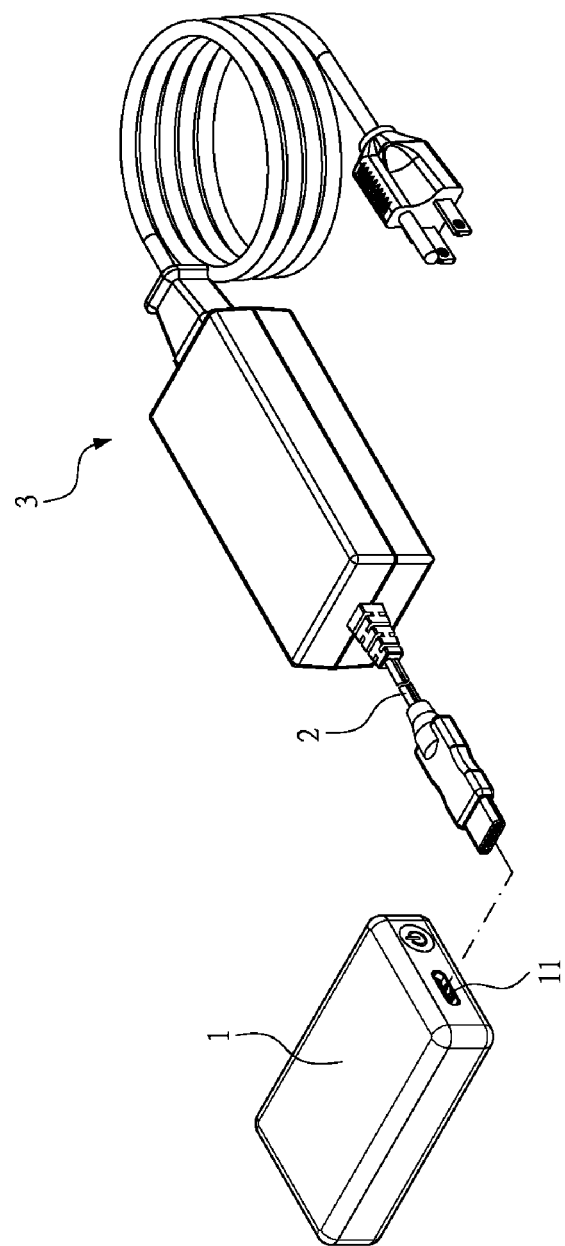
FIG. 1A is a schematic diagram showing a charge-discharge device in an embodiment.
Figure 1B:
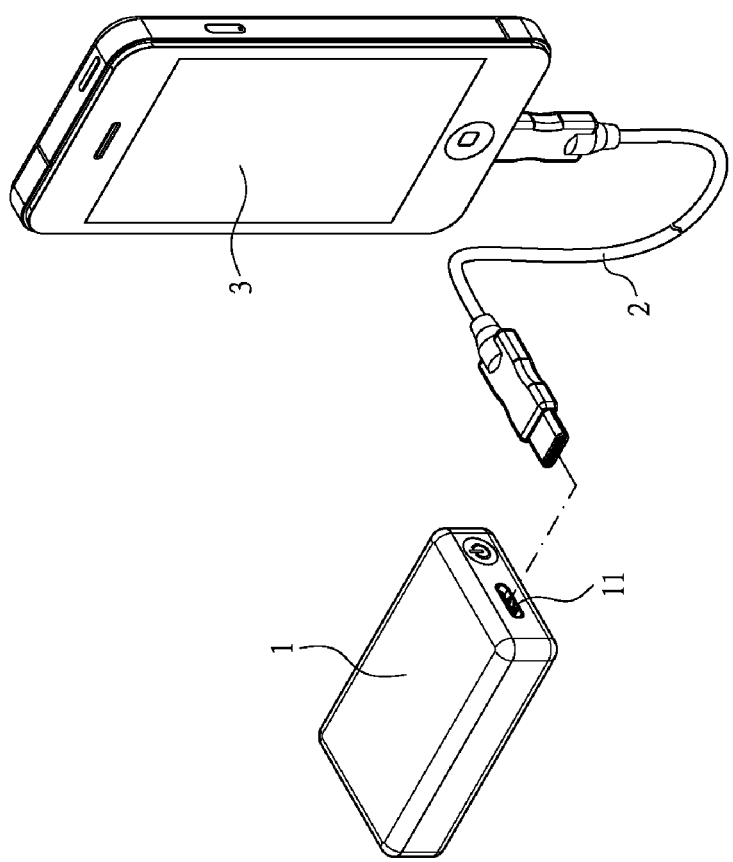
FIG. 1B is a schematic diagram showing a charge-discharge device in an embodiment.

FIG. 1A and FIG. 1B are schematic diagrams showing a charge-discharge device in an embodiment. Please refer to FIG. 1 and FIG. B, in an embodiment, a charge-discharge device 1 includes a USB port 11. The USB port 11 is connected to an electronic device 3 via a USB transmission line 2. In an embodiment, the electronic device 3 is a downstream facing port (DFP) device with power supply ability (which is called as a power supply device hereafter), such as an adapter. The charge-discharge device 1 receives electric power from the electronic device 3 and stores the electric power. In an embodiment, the electronic device 3 is an upstream facing port (UFP) device or a dual role port (DRP) device with power receiving ability (which is called as a power receiving device hereafter), such as a phone, a tablet computer or a personal digital assistant (PDA). In an embodiment, the charge-discharge device 1 is configured to provide electric power to the electronic device 3. In an embodiment, the USB port 11 is a type C interface conforming to USB 3.1.

Figure 2:
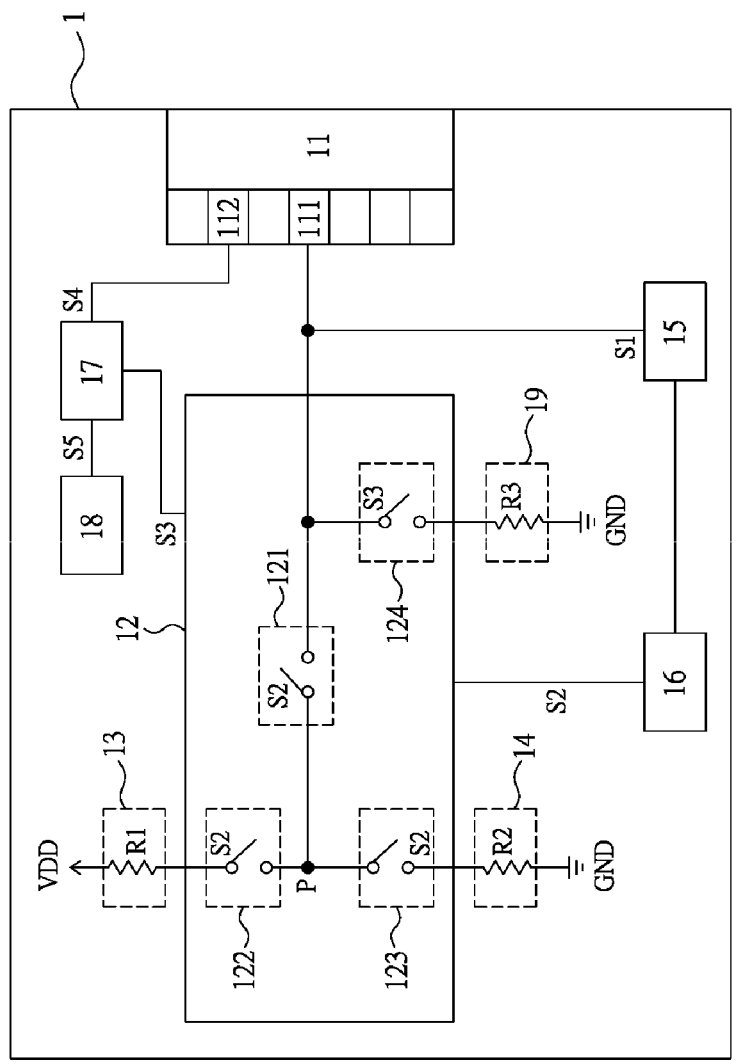
FIG. 2 is a block diagram showing a circuit structure of the charge-discharge device shown in FIG. 1A and FIG. 1B in an embodiment.

FIG. 2 is a block diagram showing a circuit structure of the charge-discharge device shown in FIG. 1A and FIG. 1B in an embodiment. Please refer to FIG. 2, the charge-discharge device 1 includes the USB port 11, a switching circuit 12, a pull-up circuit 13, a pull-down circuit 14, a sampling circuit 15 and a control circuit 16. According to the specification of the USB type-C interface, the USB port 11 includes a configuration channel (CC) 111 and a power channel 112. The switching circuit 12 is connected to the USB port 11, the pull-up circuit 13 and the pull-down circuit 14, respectively. The pull-up circuit 13 is connected to a power source VDD. The pull-down circuit 14 is connected to a ground terminal GND. In an embodiment, the pull-up circuit 13 and the pull-down circuit 14 are resistors R1, R2, respectively. The sampling circuit 15 is connected to the configuration channel 111 of the USB port 11 and the control circuit 16, respectively. The control circuit 16 is connected to the switching circuit 12. In an embodiment, the charge-discharge device 1 further includes a charging circuit 17 and a battery 18. The charging circuit 17 is connected to the power channel 112 and the battery 18. The battery 18 is configured to store power and the charging circuit 17 outputs a second charging voltage S4 according to the power.

The configuration channel 111 is configured to receive an input voltage signal S1. In an embodiment, when the charge-discharge device 1 is connected to the electronic device 3, the input voltage signal S1 received by the configuration channel 111 is from the electronic device 3. The input voltage signal S1 output by the electronic device 3 has a different logic levels when the electronic device 3 is regarded as a power supply device or a power receiving device. In an embodiment, in the USB type-C specification, as shown in FIG. 1A, when the electronic device 3 is the power supply device, the input voltage signal S1 output by the electronic device 3 is in a high potential. As shown in FIG. 1B, when the electronic device 3 is the UFP device, the input voltage signal S1 output by the electronic device 3 is in a low potential. When the electronic device 3 is the DRP device, the input voltage signal S1 output by the electronic device 3 has a potential transition, that is, transition from the high potential to the low potential or from the low potential to the high potential.

An input end of the sampling circuit 15 is connected to the configuration channel 111 to receive the input voltage signal S1 from the configuration channel 111. The sampling circuit 15 samples the input voltage signal S1 many times in a predetermined period to generate a plurality of sampling values. In an embodiment, the predetermined period is 100 ms, the sampling circuit 15 samples the input voltage signal S1 100 times in 100 ms to generate 100 sampling values. The logic level of the sampling value corresponds to the input voltage signal S1. When the input voltage signal S1 is from the power supply device, and each sampling value is greater than a threshold value, it means that the input voltage signal S1 is in the high potential. When the input voltage signal S1 is from the power receiving device, and the power receiving device is the UFP device, each sampling value is less than or equal to the threshold value, it means that the input voltage signal S1 is in the low potential. When the input voltage signal S1 is from the power receiving device and the power receiving device is the DRP device, some of the sampling values are greater than the threshold value, and the rest of the sampling values are less than or equal to the threshold value, which means that the input voltage signal S1 includes the potential transition. In an embodiment, the sampling circuit 15 is an analog-to-digital converter (ADC). The sampling times are adjusted according to requirements.

An input end of the control circuit 16 is connected to an output end of the sampling circuit 15 to receive a plurality of sampling values generated by the sampling circuit 15. The control circuit 16 determines that the electronic device 3 is the power supply device or the power receiving device according to the sampling values. Then, a corresponding control signal S2 is generated to control the switching circuit 12 to be operated in a corresponding mode. Furthermore, a second charging voltage S4 is output via the power channel 112, or a first charging voltage from the electronic device 3 is input via the power channel 112. In an embodiment, the control circuit 16 is a micro controller unit (MCU), a central processing unit or an application specific integrated circuit (ASIC).

The switching circuit 12 is connected to the control circuit 16 to receive the control signal S2. The switching circuit 12 is selectively operated in a first mode or a second mode according to the control signal S2. When the switching circuit 12 is operated in the first mode, the switching circuit 12 is electrically connected to the pull-down circuit 14 and the configuration channel 111. The power supply device is connected to the pull-down circuit 14 via the configuration channel 111. A first charging voltage is generated when a voltage of the resistor R2 is detected by the electronic device 3. Then, the first charging voltage generated by the electronic device 3 is input via the power channel 112. When the switching circuit 12 is operated in the second mode, the switching circuit 12 is electrically connected to the configuration channel 111 and the pull-up circuit 13. Then, the power receiving device is connected to the pull-up circuit 13 via the configuration channel 111. The battery 18 and the charging circuit 17 are controlled by the control circuit 16 to output the second charging voltage S4. The second charging voltage S4 is output via the power channel 112.

In an embodiment, the configuration channel 111 is one of a CC1 pin or a CC2 pin of the type C port. When the configuration channel 111 is the CC1 pin, the control signal S2 is generated by the control circuit 16 according to the input voltage signal S1 received by the CC1 pin. Then, the switching circuit 12 is controlled by the control signal S2 to be selectively operated in the first mode or in the second mode. When the configuration channel 111 is the CC2 pin, the control signal S2 is generated by the control circuit 16 according to the input voltage signal S1 received by the CC2 pin. Then, the switching circuit 12 is controlled to be operated in the first mode or in the second mode selectively. In an embodiment, the pull-up circuit 13 and the pull-down circuit 14 are transistors, diodes or resistors.

As shown in FIG. 2, in an embodiment, the switching circuit 12 includes a first switch 121, a second switch 122 and a third switch 123. The control signal S2 is received at control ends of the first switch 121, the second switch 122 and the third switch 123 to turn on or turn off the first switch 121, the second switch 122 and the third switch 123 accordingly. When the switching circuit 12 is operated in the first mode, the second switch 122 is turned off, the first switch 121 and the third switch 123 are turned on. As a result, the pull-down circuit 14 is electrically connected to the configuration channel 111 and coupled to the power supply device via the third switch 123 and the first switch 121. When the switching circuit 12 is operated in the second mode, the third switch 123 is turned off, the first switch 121 and the second switch 122 are turned on. The pull-up circuit 13 is electrically connected to the configuration channel 111 and coupled to the power receiving device via the second switch 122 and the first switch 121.

When the pull-up circuit 13 is connected to the power receiving device, a current required by the power receiving device is determined by the control circuit 16 according to a voltage value at a connecting point P between the second switch 122 and the third switch 123. Then, a corresponding charging current is outputted by the charging circuit 17, and the charging current is outputted via the power channel 112. In an embodiment, when the voltage value of the connecting point P is in a range of 0.6V to 0.8V, the charging current outputted by the charging circuit 17 is 500 mA. When the voltage value of the connecting point P is in a range of 0.9V to 1.2V, the charging current outputted by the charging circuit 17 is 1.5 A. When the voltage value of the connecting point P is in a range of 1.2V to 1.5V, the charging current outputted by the charging circuit 17 is 3 A.

When the pull-down circuit 14 is connected to the power supply device, whether the power supply device inserted into the USB port 11 is conformed to an expected specification parameters is further determined by the control circuit 16 according to the voltage value of the connecting point P. When the power supply device is not conformed to the expected specification parameters, the charge-discharge device 1 is turned off by the control circuit 16.

Figure 3:
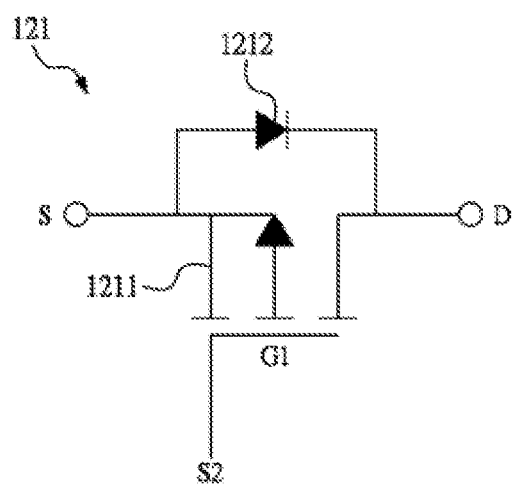
FIG. 3 is a schematic diagram showing a circuit structure of a first switch shown in FIG. 2 in an embodiment.
Figure 4:
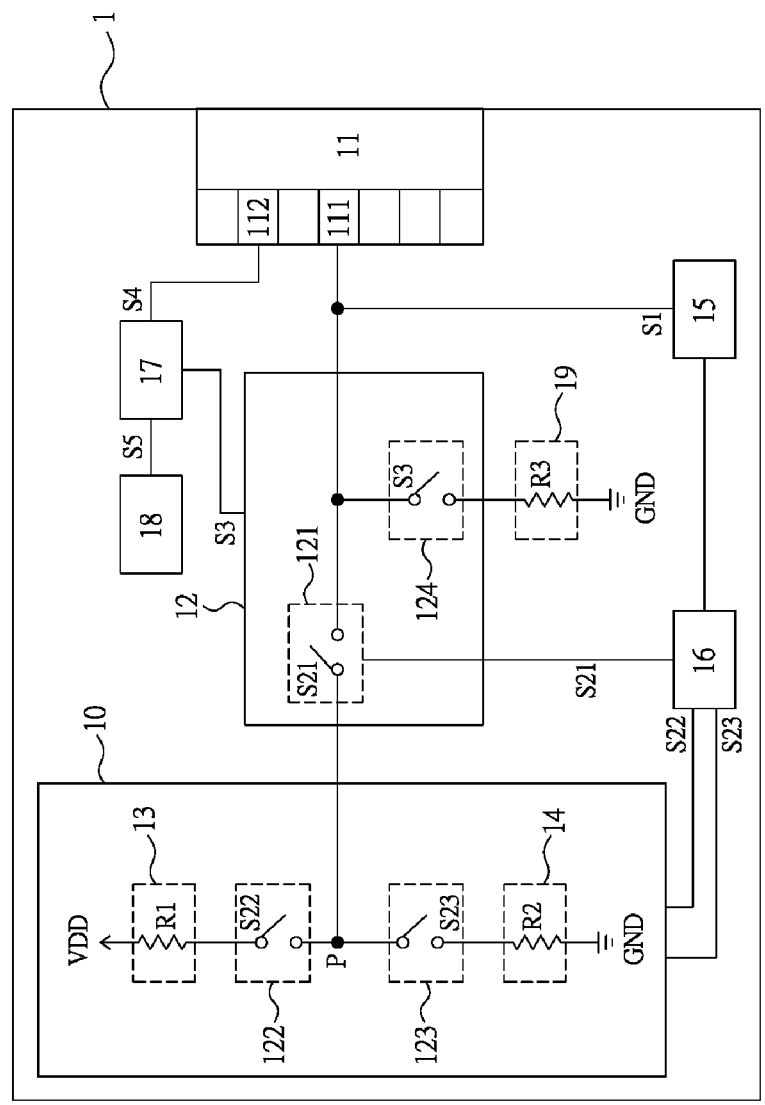
FIG. 4 is a block diagram showing a circuit structure of the charge-discharge device shown in FIG. 1A and FIG. 1B in an embodiment.

FIG. 3 is a schematic diagram showing a circuit structure of a first switch 121 shown in FIG. 2 in an embodiment. As shown in FIG. 3, the first switch 121 includes a transistor 1211 and a parasitic diode 1212. The transistor 1211 is a NMOS transistor. The control signal S2 is received by a gate terminal G1 of the transistor 1211. The gate terminal G1 of the transistor 1211 is turned on or turned off according to the control signal S2. A source terminal S and a drain terminal D of the transistor 1211 are connected between the configuration channel 111 and the connecting point P, respectively. The two end of the parasitic diode 1212 is connected between the drain terminal D and the source terminal S of the transistor 1211, respectively. When the switching circuit 12 is operated in the first mode, the transistor 1211 is turned on, and the pull-down circuit 14 is electrically connected to the configuration channel 111 via the third switch 123 and the transistor 1211. When the switching circuit 12 is operated in the second mode, the transistor 1211 is turned off, the pull-up circuit 13 is electrically connected to the configuration channel 111 via the second switch 122 and the parasitic diode 1212. FIG. 4 is a block diagram showing a circuit structure of the charge-discharge device shown in FIG. 1A and FIG. 1B in an embodiment. As shown in FIG. 4, the pull-up circuit 13, the second switch 122, the third switch 123 and the pull-down circuit 14 are configuration channel logic circuits 10. In the embodiment, the switching circuit 12 includes the first switch 121. The configuration channel logic circuit 10 includes the pull-up circuit 13, the second switch 122, the third switch 123 and the pull-down circuit 14. The control signal S2 includes a first control signal S21, a second control signal S22 and a third control signal S23. The control circuit 16 transmits the first control signal S21 to the first switch 121 to control the transistor 1211. The control circuit 16 transmits the second control signal S22 and the third control signal S23 to the configuration channel logic circuit 10 to control the second switch 122 and the third switch 123, respectively. In an embodiment, the control circuit 16 transmits the second control signal S22 and the third control signal S23 to the configuration channel logic circuit 10 via an I2C bus.

When each of the sampling value generated by the sampling circuit 15 is greater than the threshold value (in an embodiment, the second switch 122 and the third switch 123 are NMOS transistors), the first control signal S21 with high potential output from the control circuit 16 controls the transistor 1211 to turn on, the second control signal S22 with low potential output by the control circuit 16 controls the second switch 122 to turn off, and the third control signal S23 with high potential output by the control circuit 16 controls the third switch 123 to turn on. When each of the sampling value is less than or equal to the threshold value, the first control signal S21 with low potential output by the control circuit 16 controls the transistor 1211 to turn off. The second control signal S22 with high potential output by the control circuit 16 controls the second switch 122 to turn on. The third control signal S23 with low potential output by the control circuit 16 controls the third switch 123 to turn off.

Please refer to FIG. 2 and FIG. 4, the charge-discharge device 1 further includes a pull-down circuit 19. The pull-down circuit 19 is a resistor R3. The switching circuit 12 further includes a fourth switch 124. The fourth switch 124 is connected between the pull-down circuit 19 and the configuration channel 111. In an embodiment, the electric power required by the control circuit 16 is from the battery 18. When the battery 18 is in an over discharge condition, the battery 18 is unable to provide the electric power required by the control circuit 16. The control circuit 16 does not operate. As a result, the control signal S21 and the control signal S23 are in low potential. Then, the first switch 121 and the third switch 123 are turned off. As a result, the pull-down circuit 14 is unable to be electrically connected to configuration channel 111 via the first switch 121 and the third switch 123. The voltage of the resistor R2 cannot be detected by the electronic device 3, and thus the first charging voltage is not generated. Consequently, the battery 18 is not charged. As a result, when the battery 18 is in the over discharge condition, the electronic device 3 is connected to the pull-down circuit 19 via the configuration channel 111 and the fourth switch 124. The voltage of the resistor R3 is detected by the electronic device 3 and the first charging voltage is generated. Then, the battery 18 is charged.

Figure 5:
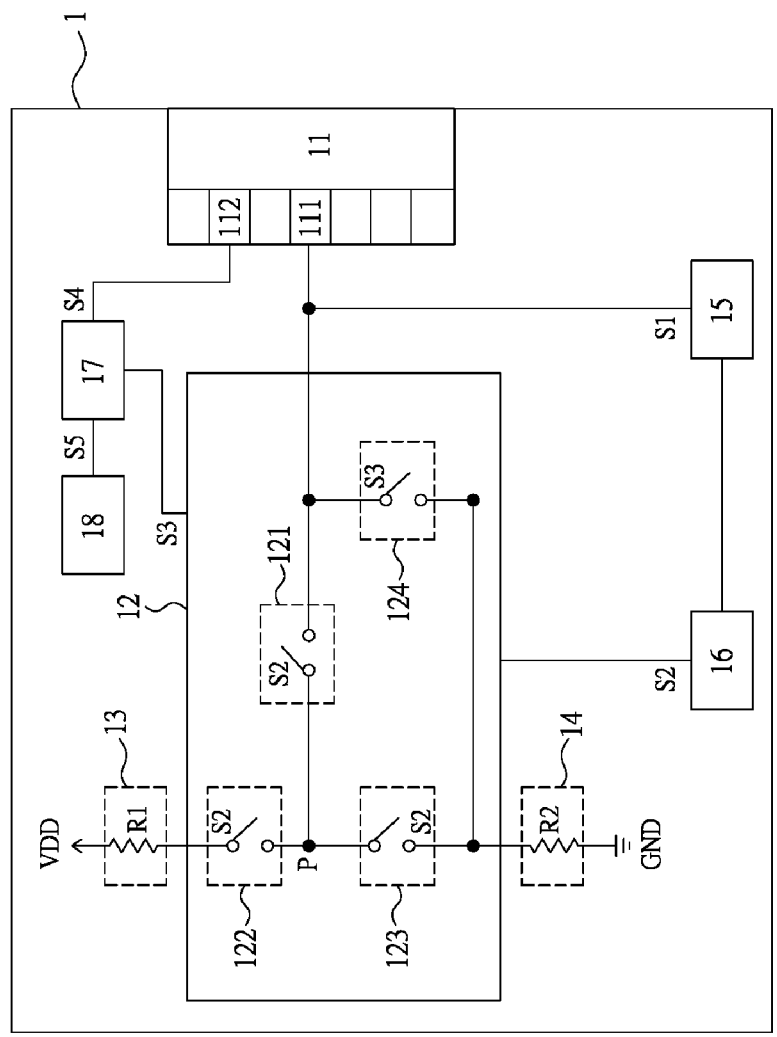
FIG. 5 is a block diagram showing a circuit structure of the charge-discharge device shown in FIG. 1A and FIG. 1B in an embodiment.

FIG. 5 is a block diagram showing a circuit structure of the charge-discharge device shown in FIG. 1A and FIG. 1B in an embodiment. As shown in FIG. 5, the fourth switch 124 is connected to the configuration channel 111 and the pull-down circuit 14, respectively. When the battery 18 is in the over discharge condition, the electronic device 3 is electrically connected to the pull-down circuit 14 via the configuration channel 111 and the fourth switch 124. The first charging voltage is generated when the voltage of the resistor R2 is detected by the electronic device 3, and then the battery 18 is charged.

Figure 6:
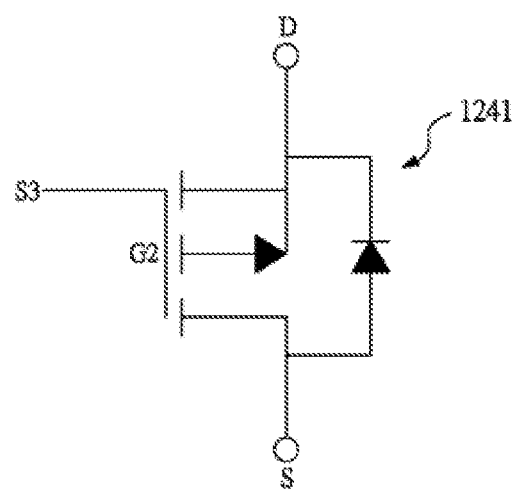
FIG. 6 is a schematic diagram showing a circuit structure of a fourth switch shown in FIG. 2, FIG. 4 and FIG. 5 in an embodiment.

FIG. 6 is a schematic diagram showing a circuit structure of a fourth switch shown in FIG. 2, FIG. 4 and FIG. 5 in an embodiment. Please refer to FIG. 2, FIG. 4 and FIG. 5, the fourth switch 124 is a normally on transistor, such as a PMOS transistor 1241 shown in FIG. 6. A voltage signal S3 from the charging circuit 17 is received by a control end of the fourth switch 124 (that is, a gate terminal G2 of the transistor 1241). When the battery 18 is not in the over discharge condition, the voltage signal S3 is in a high potential to make the fourth switch 124 off. Then, the electronic device 3 is electrically connected to the pull-down circuit 14 via the first switch 121 and the third switch 123, and the first charging voltage is generated. When the battery 18 is in the over discharge condition, the voltage signal S3 is in a low potential to make the fourth switch 124 on. Then, the electronic device 3 is electrically connected to the pull-down circuit 19 (as shown in FIG. 2 and FIG. 4) or the pull-down circuit 14 (as shown in FIG. 5) via the fourth switch 124. After the voltage of the resistor R3 or the resistor R2 is detected by the electronic device 3, the first charging voltage is generated.

Figure 7:
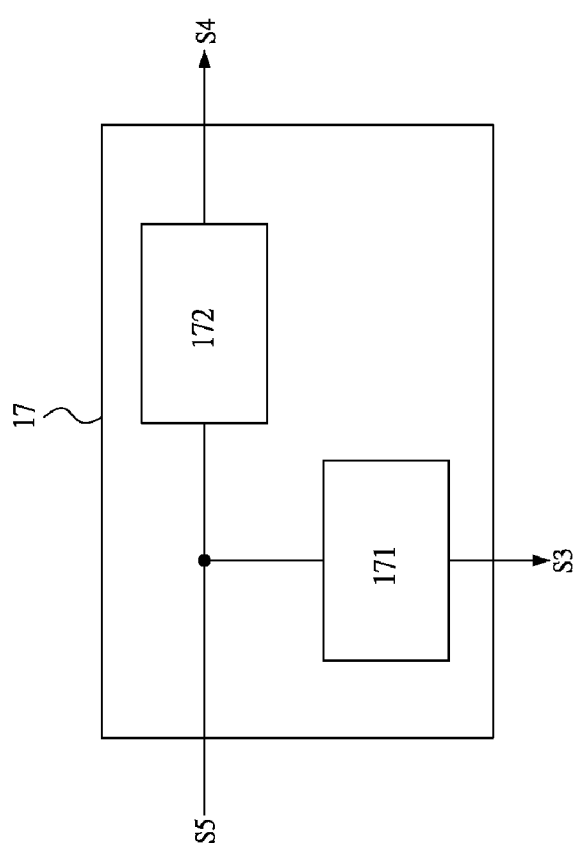
FIG. 7 is a block diagram showing a charging circuit of FIG. 2, FIG. 4 and FIG. 5 in an embodiment.

FIG. 7 is a block diagram showing a charging circuit 17 of FIG. 2, FIG. 4 and FIG. 5 in an embodiment. Please refer to FIG. 2, FIG. 4, FIG. 5 and FIG. 7, in an embodiment, the charging circuit 17 includes a low dropout regulator (LDO) 171. The low dropout regulator 171 is connected to the battery 18 and the switching circuit 12, respectively. When the battery 18 is not in the over discharge condition, an electric signal S5 from the battery 18 is received by the low dropout regulator 171. A voltage signal S3 is generated by the low dropout regulator 171 according to the electric signal S5. Then, the voltage signal S3 is in the high potential to make the fourth switch 124 off. When the battery 18 is in the over discharge condition, the battery 18 cannot provide the electric power for the low dropout regulator 171. Then, the voltage signal S3 is in the low potential to make the fourth switch 124 on. In an embodiment, a voltage of the voltage signal S3 with a high potential is 3.3V.

In an embodiment, as show in FIG. 7, the charging circuit 17 further includes a boost converter 172. The boost converter 172 is connected to the battery 18 and the power channel 112, respectively. The electric signal S5 from the battery 18 is received by the boost converter 172. A boost converting is performed by the boost converter 172 according the electric signal S5 to generate a first charging voltage S4. A voltage of the second charging voltage S4 is 5V. The second charging voltage S4 is output to the electronic device 3 via the power channel 112.

In an embodiment, when the charge-discharge device 1 is connected to an end of the transmission line 2 and the other end of the USB transmission line 2 is not connected to any device, the input voltage signal S1 received by the configuration channel 111 is determined to be in the low potential. As a result, when the input voltage signal S1 is in the low potential, whether the configuration channel 111 is connected to the power receiving device is further determined by the control circuit 16. When the configuration channel 111 is not connected to the power receiving device, the control circuit 16 makes the charge-discharge device 1 off or makes the charging circuit 17 off. Then, the second charging voltage S4 is stopped outputting by power channel 112. In addition, when the configuration channel 111 is not connected to the power receiving device, a corresponding control signal S2 is generated by the control circuit 16 to convert the switching circuit 12 to operate in the first mode from the second mode. As shown in FIG. 4, when the switching circuit 12 is operated in the second mode, the first control signal S21 with low potential is generated by the control circuit 16 to turn off the transistor 1211. A second control signal S22 with low potential is generated by the control circuit 16 to turn off the second switch 122. The third control signal S23 with high potential is generated by the control circuit 16 to turn on the third switch 123. The pull-down circuit 14 is electrically connected to the configuration channel 111 via the third switch 123 and the parasitic diode 1212.

In an embodiment, the control circuit 16 includes a counting function. When the control circuit 16 detects that the configuration channel 111 is not connected to the power receiving device, the control circuit 16 counts and generates a count value. The control circuit 16 determines whether the count value reaches a predetermined value. When the count value reaches the predetermined value, it means that the control circuit 16 is not connected to the power receiving device during a time interval in which the multiple input voltage signal S1 is input into the configuration channel 111. Then, the control circuit 16 turns off the charge-discharge device 1 or the charging circuit 17, and the power channel 112 stops outputting the second charging voltage S4. In an embodiment, the predetermined value is equal to or greater than 1.

In an embodiment, the control circuit 16 determines whether the configuration channel 111 is connected to the power receiving device according to the current through the power channel 112. When the current is less than or equal to a predetermined current value, it means that the configuration channel 111 is not connected to the power receiving device. In an embodiment, the control circuit 16 determines whether the configuration channel 111 is connected to the power receiving device according to a voltage value of the connecting point P. When the voltage value of the connecting point P is less than a predetermined voltage value, it means that the configuration channel 111 is not connected to the power receiving device.

Figure 8:
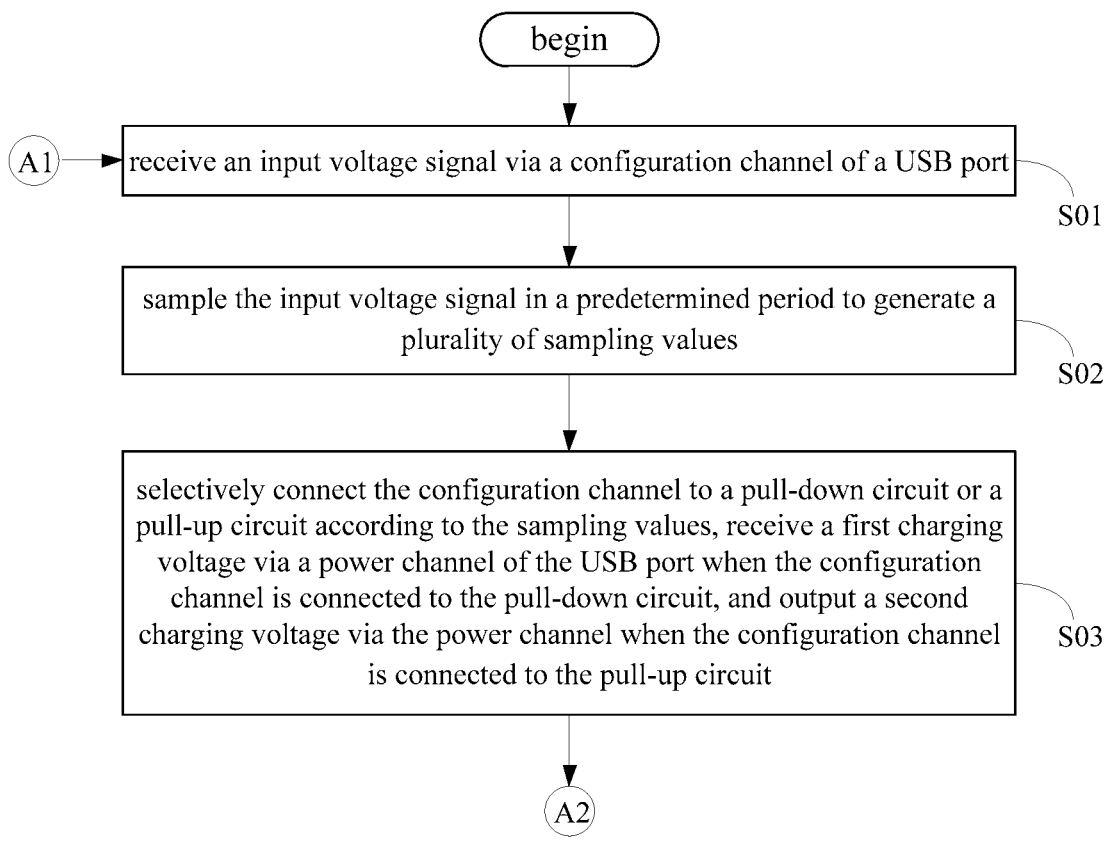
FIG. 8 is a flow diagram showing a control method of a charge-discharge device in an embodiment.

FIG. 8 is a flow diagram showing a control method of a charge-discharge device in an embodiment. Please refer to FIG. 2 and FIG. 8. In step S01, the input voltage signal S1 is received by the configuration channel 111 of the USB port 11. In step S02, after the input voltage signal S1 is input, the sampling circuit 15 samples the input voltage signal S1 many times in a predetermined period to generate a plurality sampling values. In step S03, the control circuit 16 determines that the electronic device 3 is a power supply device or a power receiving device according to the sampling values, and the configuration channel 111 is selectively connected to the pull-down circuit 14 or the pull-up circuit 13. Then, after the configuration channel 111 is connected to the pull-down circuit 14, the first charging voltage from the power supply device is received by the power channel 112 of the USB port 11. As a result, the battery 18 is charged. After the configuration channel 111 is connected to the pull-up circuit 13, the second charging voltage S4 is output via the power channel 112. When the power receiving device is connected to the power channel 112, the power receiving device begins to be charged.

Figure 9:
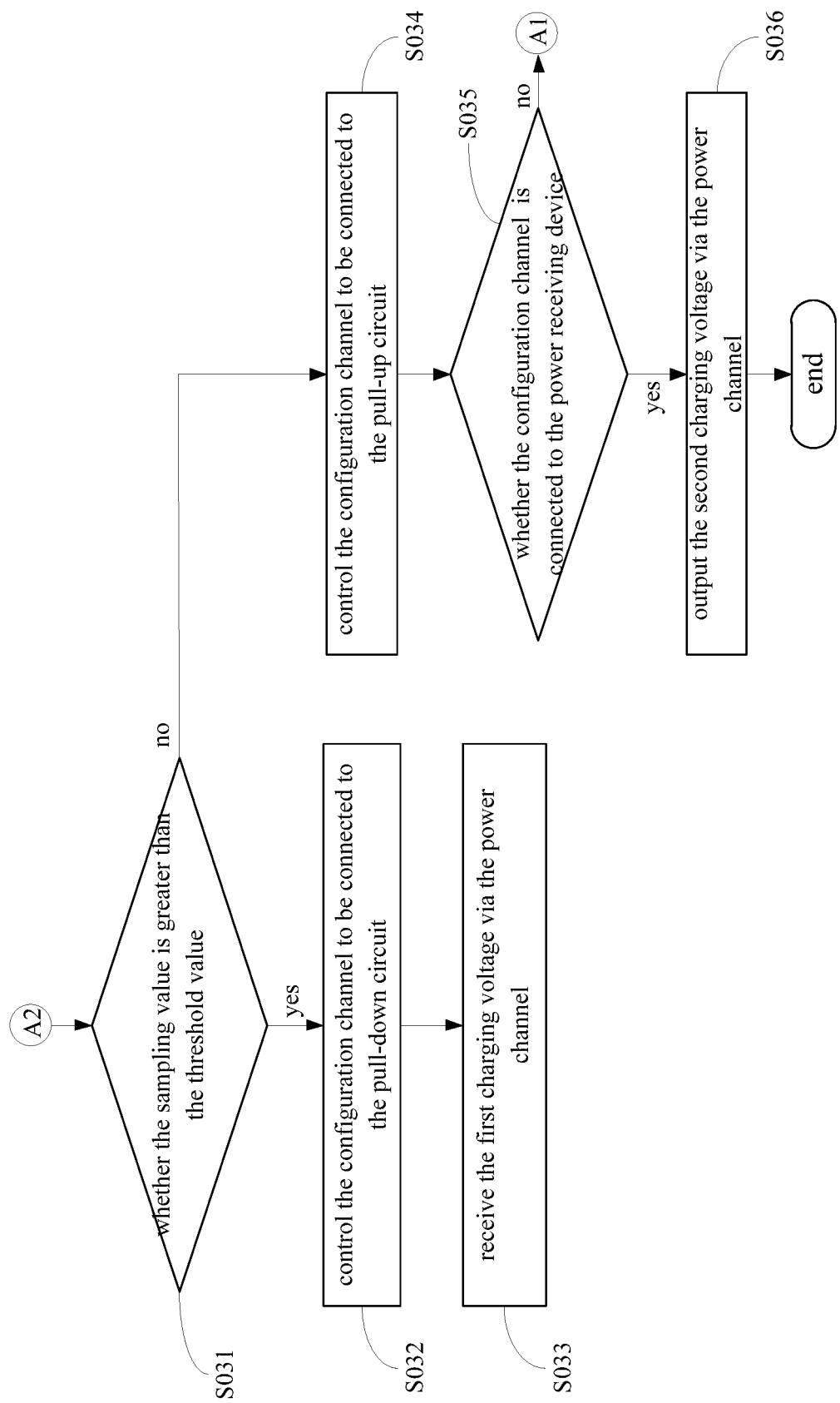
FIG. 9 is a flow diagram showing a step of the control method in FIG. 8 in an embodiment.

FIG. 9 is a flow diagram showing a step of the control method in FIG. 8 in an embodiment. Please refer to FIG. 2 and FIG. 9. In step S031, the control circuit 16 compares each sampling value with a threshold value to determine whether each sampling value is greater than the threshold value. If yes, it means that the electronic device 3 is a power supply device. In step S032, the control circuit 16 controls the configuration channel 111 to be connected to the pull-down circuit 14 via the switching circuit 12. In step S033, the first charging voltage from the power supply device is received via the power channel 112 after the resistor R2 is detected by the power supply device. When the sampling values are not greater than the threshold value in step S031, it means that each sampling value is less than or equal to the threshold value, the electronic device 3 determined as the power receiving device. In step S034, the control circuit 16 controls the configuration channel 111 to be connected to the pull-up circuit 13 via the switching circuit 12. In step S035, whether the configuration channel 111 is connected to the power receiving device is determined. When the configuration channel 111 is connected to the power receiving device, in step S036, the second charging voltage S4 is output via the power channel 112. When the configuration channel 111 is not connected to the power receiving device, the control circuit 16 re-determines the potential of the input voltage signal S1 according to the input voltage signal S1 received by the configuration channel 111 to control the operation mode of the switching circuit 12. The charge-discharge device 1 is turned off after when the count value reaches the predetermined value. In an embodiment, the second charging voltage S4 is output by the power channel 112 before the control circuit 16 executes the step S035. When the configuration channel 111 is not connected to the power receiving device, the control circuit 16 controls the power channel 112 to stop outputting the second charging voltage S4 by turning off the charge-discharge device 1 or the charging circuit 17.

In an embodiment, the control method further includes that when the battery 18 is in the over discharge condition, the configuration channel 111 is connected to the pull-down circuit 14 or the pull-down circuit 19 via the fourth switch 124, to make the power supply device detect the resistor R3 or the resistor R2 via the fourth switch 124 when the first switch 121, the second switch 122 and the third switch 123 are turned off. Then, the first charging voltage is generated. The first charging voltage generated by the power supply device is input via the power channel 112 to charge the battery 18.

In conclusion, the charge-discharge device and the control method of the same are provided. The charge-discharge device includes a USB port. Regardless of any one of the two ends of the USB transmission line is inserted into the USB port, the charge-discharge device is operated normally. Furthermore, the electric power is received from the power supply device or the electric power for the power receiving device is outputted via a same power channel. As a result, the production cost is saved, and the usage is more convenient.

Although the invention has been disclosed with reference to certain embodiments thereof, the disclosure is not for limiting the scope. Persons having ordinary skill in the art may make various modifications and changes without departing from the scope of the invention. Therefore, the scope of the appended claims should not be limited to the description of the embodiments described above.

What is claimed is:

1. A control method of a charge-discharge device, comprising:
   receiving an input voltage signal via a configuration channel of a USB port;
   sampling the input voltage signal in a predetermined period to generate a plurality of sampling values;
   when each of the sampling values is greater than a threshold value, the configuration channel is connected to a pull-down circuit, when each of the sampling values is less than or equal to the threshold value, the configuration channel is connected to the pull-up circuit; and
   receiving a first charging voltage via a power channel of the USB port when the configuration channel is connected to the pull-down circuit, and outputting a second charging voltage via the power channel when the configuration channel is connected to the pull-up circuit.

2. The control method of a charge-discharge device according to claim 1, wherein when the configuration channel connects to the pull-up circuit, the control method further comprises a step:
   determining whether the configuration channel is connected to a power receiving device, and when the configuration channel is connected to the power receiving device, the second charging voltage is output via the power channel.

3. The control method of a charge-discharge device according to claim 2, wherein in the step of determining whether the configuration channel is connected to the power receiving device, the configuration channel connected to the power receiving device is determined when a current value of the power channel is greater than a predetermined current value.

4. The control method of a charge-discharge device according to claim 1, wherein when a battery connected to the power channel is in an over discharge condition, the configuration channel is connected to the pull-down circuit or another pull-down circuit.

5. A charge-discharge device, comprising:
   a USB port, including a configuration channel and a power channel, and the configuration channel is configured to receive an input voltage signal;
   a sampling circuit connected to the configuration channel and configured to sample the input voltage signal in a predetermined period to generate a plurality of sampling values;
   a pull-up circuit connected to a power source;
   a pull-down circuit connected to a ground terminal;
   a control circuit configured to generate a control signal according to the sampling values; and
   a switching circuit connected to the control circuit, the configuration channel, the pull-down circuit and the pull-up circuit, the switching circuit is configured to be operated in a first mode according to the control signal when each of the sampling values is greater than a threshold value, and the switching circuit is configured to be operated in a second mode according to the control signal when each of the sampling values is less than or equal to the threshold value, in the first mode, the configuration channel is connected to the pull-down circuit via the switching circuit to make the power channel receive a first charging voltage, in the second mode, the configuration channel is connected to the pull-up circuit via the switching circuit to output a second charging voltage from the power channel.

6. The charge-discharge device according to claim 5, wherein the switching circuit includes a first switch, a second switch and a third switch, the second switch is connected to the pull-up circuit and the third switch, the third switch is connected to the second switch and the pull-down circuit, the first switch is connected to the second switch, the third switch and the configuration channel, in the first mode, the first switch and the third switch are turned on and the second switch are turned off to make the configuration channel be connected to the pull-down circuit, in the second mode, the first switch and the second switch are turned on and the third switch is turned off to make the configuration channel be connected to the pull-up circuit.

7. The charge-discharge device according to claim 6, wherein the first switch includes a transistor and a parasitic diode connected to the transistor, in the first mode, the transistor is turned on, the configuration channel is connected to the pull-down circuit via the transistor, in the second mode, the transistor is turned off and the parasitic diode are turned on, the configuration channel is connected to the pull-up circuit via the parasitic diode.

8. The charge-discharge device according to claim 6, wherein the charge-discharge device further includes a battery connected to the power channel, the switching circuit further includes a fourth switch connected between the configuration channel and the pull-down circuit or another pull-down circuit, in the first mode and the second mode, the fourth switch is turned off, when the battery is in an over discharge condition, the first switch, the second switch and the third switch are turned off and the fourth switch are turned on, the configuration channel is connected to the pull-down circuit or the another pull-down circuit via the fourth switch.

9. The charge-discharge device according to claim 5, wherein in the second mode, whether the configuration channel is connected to a power receiving device is determined, when the configuration channel is not connected to the power receiving device, the control circuit controls the power channel to stop outputting the second charging voltage.

10. A control method of a charge-discharge device, comprising:
receiving an input voltage signal via a configuration channel of a USB port;
sampling the input voltage signal in a predetermined period to generate a plurality of sampling values; and
selectively connecting the configuration channel to a pull-down circuit or a pull-up circuit according to the sampling values, receiving a first charging voltage via a power channel of the USB port when the configuration channel is connected to the pull-down circuit, and outputting a second charging voltage via the power channel when the configuration channel is connected to the pull-up circuit;
wherein when a battery connected to the power channel is in an over discharge condition, the configuration channel is connected to the pull-down circuit or another pull-down circuit.

11. A charge-discharge device, comprising:
a USB port, including a configuration channel and a power channel, and the configuration channel is configured to receive an input voltage signal;
a sampling circuit connected to the configuration channel and configured to sample the input voltage signal in a predetermined period to generate a plurality of sampling values;
a pull-up circuit connected to a power source;
a pull-down circuit connected to a ground terminal;
a control circuit configured to generate a control signal according to the sampling values; and
a switching circuit connected to the control circuit, the configuration channel, the pull-down circuit and the pull-up circuit, the switching circuit is configured to be selectively operated in a first mode or in a second mode according to the control signal, in the first mode, the configuration channel is connected to the pull-down circuit via the switching circuit to make the power channel receive a first charging voltage, in the second mode, the configuration channel is connected to the pull-up circuit via the switching circuit to output a second charging voltage from the power channel;
wherein the switching circuit includes a first switch, a second switch and a third switch, the second switch is connected to the pull-up circuit and the third switch, the third switch is connected to the second switch and the pull-down circuit, the first switch is connected to the second switch, the third switch and the configuration channel, in the first mode, the first switch and the third switch are turned on and the second switch are turned off to make the configuration channel be connected to the pull-down circuit, in the second mode, the first switch and the second switch are turned on and the third switch is turned off to make the configuration channel be connected to the pull-up circuit.

12. The charge-discharge device according to claim 11, wherein the first switch includes a transistor and a parasitic diode connected to the transistor, in the first mode, the transistor is turned on, the configuration channel is connected to the pull-down circuit via the transistor, in the second mode, the transistor is turned off and the parasitic diode are turned on, the configuration channel is connected to the pull-up circuit via the parasitic diode.

13. The charge-discharge device according to claim 11, wherein the charge-discharge device further includes a battery connected to the power channel, the switching circuit further includes a fourth switch connected between the configuration channel and the pull-down circuit or another pull-down circuit, in the first mode and the second mode, the fourth switch is turned off, when the battery is in an over discharge condition, the first switch, the second switch and the third switch are turned off and the fourth switch are turned on, the configuration channel is connected to the pull-down circuit or the another pull-down circuit via the fourth switch.

* * * * *